US012773933B2

(12) United States Patent
He et al.

(10) Patent No.: US 12,773,933 B2
(45) Date of Patent: Oct. 27, 2026

(54) CHILD SAFETY SEAT

(71) Applicant: GOODBABY CHILD PRODUCTS CO., LTD., Kunshan (CN)

(72) Inventors: Xinjun He, Kunshan (CN); Zhiyong Kuang, Kunshan (CN); Wang Liu, Kunshan (CN)

(73) Assignee: GOODBABY CHILD PRODUCTS CO., LTD., Kunshan (CN)

( * ) Notice: Subject to any disclaimer, the term of this patent is extended or adjusted under 35 U.S.C. 154(b) by 288 days.

(21) Appl. No.: 18/577,786

(22) PCT Filed: Dec. 20, 2021

(86) PCT No.: PCT/CN2021/139481
§ 371 (c)(1),
(2) Date: Jan. 9, 2024

(87) PCT Pub. No.: WO2023/284253
PCT Pub. Date: Jan. 19, 2023

(65) Prior Publication Data

US 2024/0308398 A1 Sep. 19, 2024

(30) Foreign Application Priority Data

Jul. 14, 2021 (CN) ........................ 202110793853.5

(51) Int. Cl.
*B60N 2/28* (2006.01)

(52) U.S. Cl.
CPC ........... *B60N 2/2893* (2013.01); *B60N 2/286* (2013.01); *B60N 2/2863* (2013.01); *B60N 2/2875* (2013.01)

(58) Field of Classification Search
CPC ..... B60N 2/2893; B60N 2/286; B60N 2/2863
See application file for complete search history.

(56) References Cited

U.S. PATENT DOCUMENTS

| | | | | |
|---|---|---|---|---|
| 6,209,957 B1 * | 4/2001 | Baloga | ................. | B60N 2/2893 297/250.1 |
| 2009/0273215 A1 * | 11/2009 | Barker | ................. | B60N 2/2821 297/253 |

FOREIGN PATENT DOCUMENTS

| | | | |
|---|---|---|---|
| CN | 202098306 U | 1/2012 | |
| CN | 104890542 A * | 9/2015 | ............. B60N 2/286 |

(Continued)

OTHER PUBLICATIONS

CN-104890542-A, machine translation (Year: 2015).*

(Continued)

*Primary Examiner* — David R Dunn
*Assistant Examiner* — Tania Abraham
(74) *Attorney, Agent, or Firm* — MUNCY, GEISSLER, OLDS & LOWE, P.C.

(57) ABSTRACT

A child safety seat is provided including a seat body and a connector connected to the seat body for connecting to a vehicle seat, the safety seat has a forward usage state and a reverse usage state, the connector is movably arranged on the seat body, and the connector can further protrude forward or rearward relative to the seat body to connect to the vehicle seat, and the relative movement between the seat body and the connector enables the child safety seat to switch between the forward usage state and the reverse usage state for installation. The child safety seat of the present disclosure can be switched between the forward usage state and the reverse usage state only by rotating the connector relative to the seat body and then installed in the forward or reverse direction, which is convenient to operate.

18 Claims, 12 Drawing Sheets

(56) References Cited

FOREIGN PATENT DOCUMENTS

| | | | | | |
|---|---|---|---|---|---|
| CN | 204712918 | U | | 10/2015 | |
| CN | 204749906 | U | | 11/2015 | |
| CN | 204978312 | U | * | 1/2016 | ............ B60N 2/286 |
| CN | 105291912 | A | | 2/2016 | |
| CN | 205365305 | U | * | 7/2016 | |
| CN | 105936227 | A | | 9/2016 | |
| CN | 106965717 | A | | 7/2017 | |
| CN | 206704011 | U | | 12/2017 | |
| CN | 207311198 | U | | 5/2018 | |
| CN | 113665444 | A | | 11/2021 | |
| GB | 2495798 | A | | 4/2013 | |

OTHER PUBLICATIONS

CN-204978312-U, machine translation (Year: 2016).*
CN-205365305-U, machine translation (Year: 2016).*
International Search Report for PCT/CN2021/139481 mailed Mar. 28, 2022.

* cited by examiner

CHILD SAFETY SEAT

CROSS-REFERENCE TO RELATED APPLICATIONS

This application claims priority to PCT/CN2021/139481, filed on Dec. 20, 2021, which claims priority to Chinese Application No. 202110793853.5, filed on Jul. 14, 2021, the entire contents both of which are hereby incorporated by reference.

FIELD OF TECHNOLOGY

The following relates to the field of children products, and in particular to a child safety seat.

BACKGROUND

As a safety tool for children to ride in vehicles, child safety seats are increasingly used. Usually, in order to accommodate children of different ages or heights, child safety seats need to be installed in a forward or reverse direction when installed on vehicle seats. The child safety seat in conventional art usually comprises a seat body and an ISOFIX connector fixedly arranged at the bottom of the seat body, the seat body comprises a base, a seat that can rotatably mounted on the base, and a locking mechanism that locks the base and seat relative to each other, the ISOFIX connector can only extend in a fixed direction relative to the seat body, so users can only connect the seat body to the vehicle seat through the ISOFIX connector in a forward usage state, or can only connect the seat body to the vehicle seat through the ISOFIX connector in a reverse usage state, which requires multiple ways to connect the child safety seat to the vehicle seat, making the structure of the child safety seat more complex and inconvenient to operate.

SUMMARY

An aspect relates to a child safety seat with a simple structure that can be connected to a vehicle seat through an ISOFIX connector in both forward and reverse usage states.

To achieve the above aspect, a technical solution employed by the present disclosure is:

A child safety seat comprises a seat body and a connector connected to the seat body for connecting to a vehicle seat, the child safety seat has a forward usage state and a reverse usage state, the connector is movably arranged on the seat body, and the connector is configured to protrude forward or rearward relative to the seat body to connect to the vehicle seat, and the relative movement between the seat body and the connector enables the child safety seat to switch between the forward usage state and the reverse usage state for installation.

According to some implementation aspects of the present disclosure, the connector is rotatably connected to the seat body through a rotating shaft that extends obliquely along an up-down direction, and the rotating shaft is fixedly connected to the connector.

In some desired and specific implementation solutions, in the forward usage state, the rotating shaft extends obliquely and downwards from front to rear, and in the reverse usage state, the rotating shaft extends obliquely and upwards from front to rear. The rotating shaft is arranged to extend obliquely in a specific direction, so that when the seat body is rotated to the reverse usage state, the upper portion of a backrest of the seat body can tilt downwards, making it convenient for young children to ride; when the seat body is rotated to the forward usage state, the backrest of the seat body leans against the vehicle seat, making it convenient for older children to ride.

Further, an angle between the axis of the rotating shaft and the plane where an upper surface of the connector is located is an obtuse angle, the obtuse angle ranges from 100°-110°.

Further, a first connecting piece capable of being connected to or separated from the connector is arranged on the seat body and behind the rotating shaft, a second connecting piece capable of being connected to or separated from the connector is arranged on the seat body and in front of the rotating shaft, and when the connector is connected to the first connecting piece, the safety seat is in the forward usage state; when the connector is connected to the second connecting piece, the safety seat is in the reverse usage state; when the connector is separated from the first connecting piece and the second connecting piece, the connector moves relative to the seat body.

In some desired and specific implementation solutions, the connector comprises a connector body rotatably connected to the bottom of the seat body through the rotating shaft, and a third connecting piece fixedly arranged on the connector body for connecting to or separating from the first connecting piece or the second connecting piece, wherein the third connecting piece extends obliquely along an up-down direction. The connector body, whether in the forward or reverse usage state of the safety seat, always extends horizontally to facilitate connection with the ISOFIX interface of the vehicle seat.

In some embodiments, the first connecting piece and the second connecting piece are respectively a first connecting rod and a second connecting rod extended along the left-right direction of the seat body, simplifying the structure of the vehicle seat. Further, the third connecting piece is provided with a through hole for inserting or separating from the first connecting rod or the second connecting rod.

In some desired and specific implementation solutions, in the forward usage state, the third connecting piece extends obliquely and downwards from front to rear.

According to some implementation aspects of the present disclosure, the safe seat further comprises a locking mechanism for locking the safety seat in the forward usage state or the reverse usage state, wherein the locking mechanism comprises a locking member movable arranged on one of the seat body and the connector, a first locking slot and a second locking slot that are arranged on the other one of the seat body and the connector respectively on two opposite sides of the rotating shaft and fitted to insert or separate from the locking member, and when the locking member is inserted into any one of the first locking slot and the second locking slot, the locking mechanism locks the safety seat in the forward usage state or the reverse usage state; when the locking member is separated from both the first locking slot and the second locking slot, the locking mechanism is unlocked.

In some desired and specific implementation solutions, the connector comprises a connector body rotatably connected to the bottom of the seat body through the rotating shaft, and a third connecting piece fixedly arranged on the connector body, the locking member is slidably connected to the third connecting piece, the locking mechanism further comprises an elastic element arranged between the locking member and the connector body such that the locking member tends to be inserted into the first locking slot or the second locking slot, and the locking member has an operating portion for operating the locking member to tend to separate from both the first locking slot and the second locking slot.

Further, the first locking slot and the second locking slot are respectively opened on the seat body and the first locking slot is located behind the second locking slot, and when the locking member is inserted into the first locking slot, the locking mechanism locks the safety seat in the forward usage state; when the locking member is inserted into the second locking slot, the locking mechanism locks the safety seat in the reverse usage state;

In the present disclosure, the third connecting piece connected to or separated from the first connecting piece or the second connecting piece and the third connecting piece slidably connected to the locking member may be the same component, or may be two different components.

According to some implementation aspects of the present disclosure, two connectors are symmetrically provided on the left and right sides of the seat body, and the connector on each side comprises a connector body rotatably connected to the bottom of the seat body and a third connecting piece fixedly arranged on the connector body, the connector body comprises a connecting frame that is rotatably connected to the bottom of the seat body and a joint that is slidably connected to the connecting frame along the front-rear direction of the seat body and is used for connecting to the vehicle seat, the joint is configured to extend from one end portion of the connecting frame to connect to the vehicle seat, and the length of the joint extending from the connecting frame is adjustable, the third connecting piece is fixedly arranged on the connecting frame, and the third connecting piece is configured to be connected to or separated from the front or rear of the seat body.

Further, the joint has an opening for connecting the ISOFIX interface on the vehicle seat, and when the safety seat is in the forward usage state or the reverse usage state, the opening faces opposite to the forward moving direction of the vehicle.

Even further, the joint is further provided with a movable locking hook portion within the opening for coordinating and connecting to the vehicle seat, and the movable locking hook portion is configured to be folded or extended relative to the upper side wall of the opening.

Further, the joint also extends forward or rearward relative to the seat body to connect to the vehicle seat, and when the child safety seat is in the forward usage state, the joint extends rearward relative to the seat body to connect to the vehicle seat; when the child safety seat is in the reverse usage state, the joint extends forward relative to the seat body to connect to the vehicle seat.

According to some implementation aspects of the present disclosure, when the safety seat is in the forward usage state, the connector extends rearward relative to the seat body to connect to the vehicle seat; when the safety seat is in the reverse usage state, the connector extends forward relative to the seat body to connect to the vehicle seat.

Further, a lower surface of the seat body has a first support surface that extends horizontally when the child safety seat is in the forward usage state, and when the child safety seat is in the forward usage state, the child safety seat is in a sitting-posture state; a rear surface of the seat body has a second support surface that extends horizontally when the child safety seat is in the reverse usage state, and when the child safety seat is in the reverse usage state, the child safety seat is in a lying-posture state.

In an embodiment, an angle formed between the plane where the first support surface is located and the plane where the second support surface is located is an acute angle, the acute angle formed between the plane where the first support surface is located and the plane where the second support surface is located is 5° to 60°;

and/or, in the reverse usage state, an angle formed between the plane where the first support surface is located and the horizontal plane is an acute angle, in the reverse usage state, the acute angle formed between the plane where the first support surface is located and the horizontal plane is 25° to 35°.

According to some implementation aspects of the present disclosure, the seat body is an integrated structure.

Due to the use of the above technical solutions, the present disclosure has the following advantages over the conventional art:

The child safety seat of the present disclosure can be switched between the forward usage state and the reverse usage state only by rotating the connector relative to the seat body and then installed in the forward or reverse direction, which is convenient to operate, and compared with traditional safety seats, the present disclosure can use the connector to connect to the vehicle seat in both the forward usage state and the reverse usage state, simplifying the structure of the seat body, making the structure of the child safety seat simpler and more convenient to process.

BRIEF DESCRIPTION

Some of the embodiments will be described in detail, with references to the following Figures, wherein like designations denote like members, wherein.

In the figures: 100, seat body; 200, connector; 1, rotating shaft; 2, locking member; 2*a*, sliding portion; 2*b*, operating portion; 3, first locking slot; 4, second locking slot; 5, first connecting rod; 6, second connecting rod; 7, through hole; 8, connecting frame; 9, joint; 10, third connecting piece; 11, elastic element; 12, sliding groove; 13, first avoidance groove; 14, second avoidance groove; 15, third avoidance groove; 16, position limit element; 17, opening; 18, movable locking hook portion; M, first support surface; N, second support surface.

DETAILED DESCRIPTION

Figure 1:
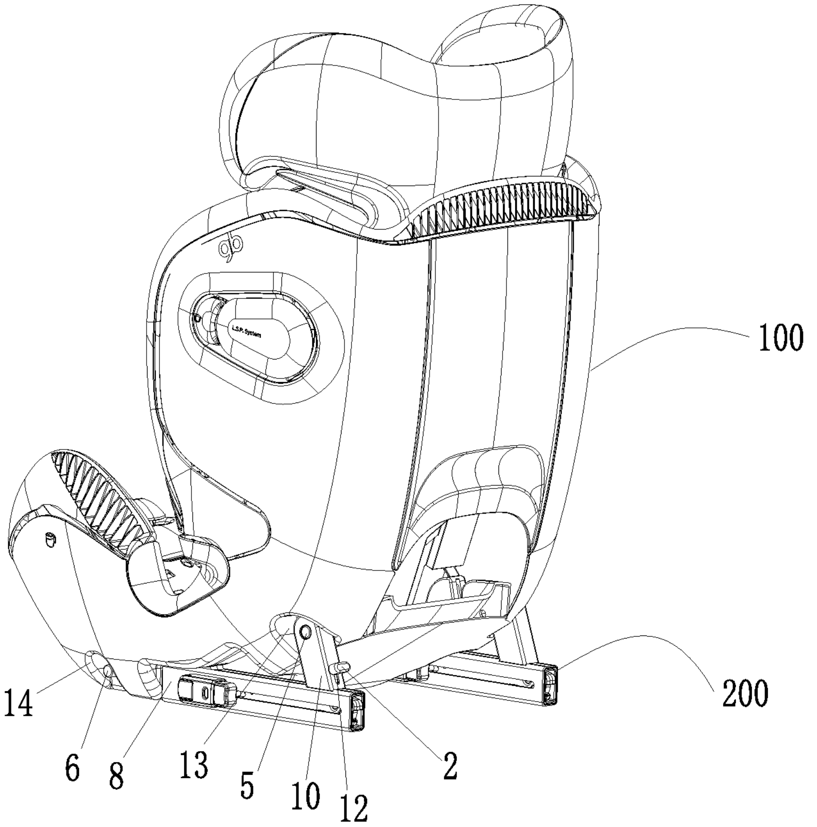
FIG. 1 is a schematic diagram of the three-dimensional structure of a child safety seat in a forward usage state according to an embodiment of the present disclosure.
Figure 2:
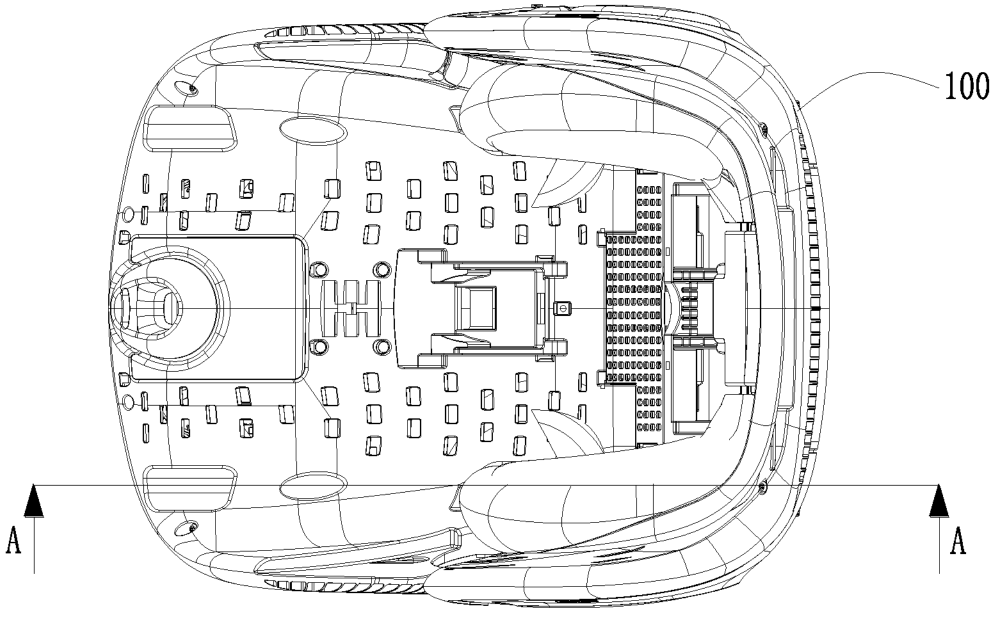
FIG. 2 is a schematic top view of the structure of a child safety seat in a forward usage state according to an embodiment of the present disclosure.
Figure 3:
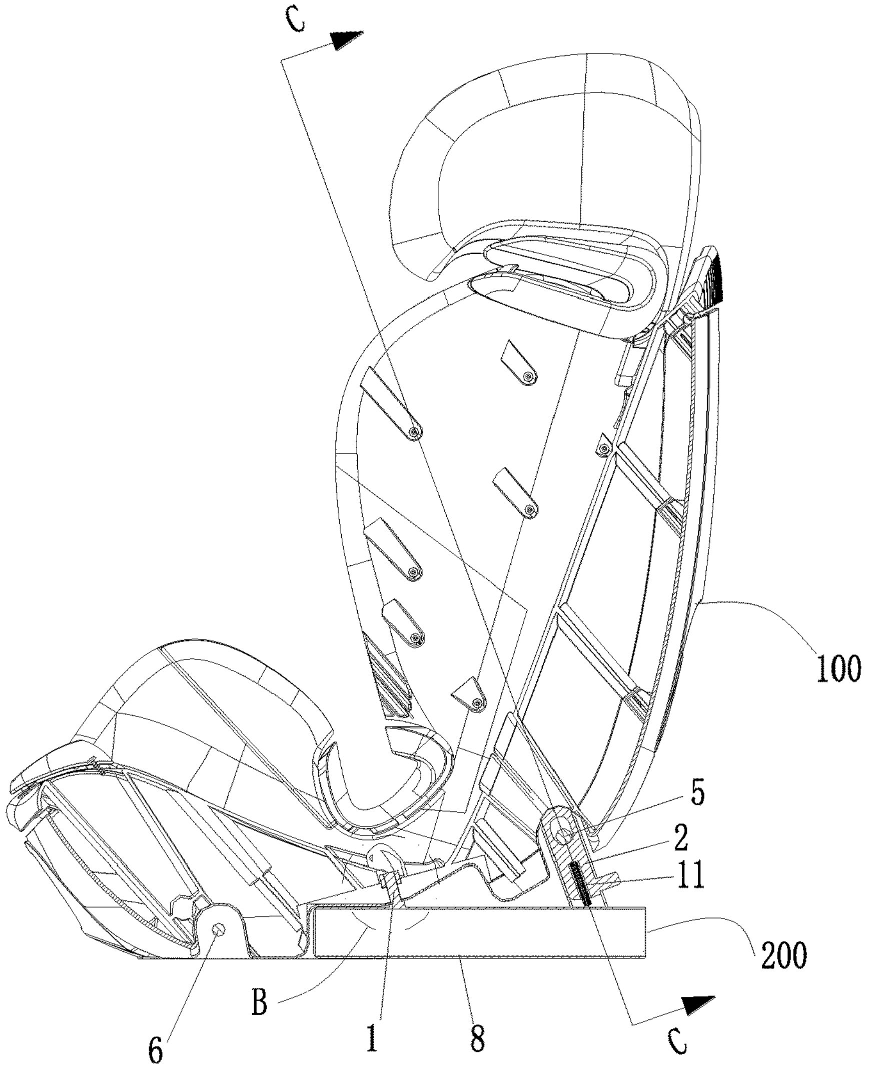
FIG. 3 is a schematic sectional view of the structure along Line A-A in FIG. 2.
Figure 4:
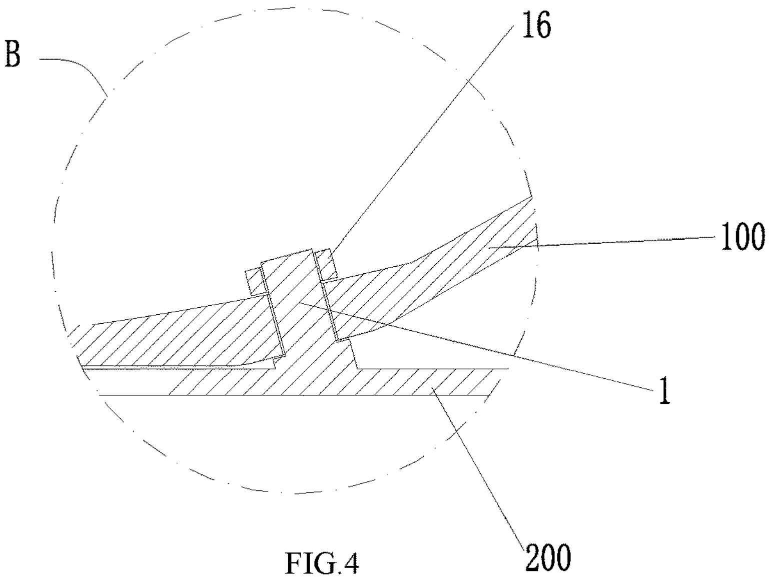
FIG. 4 is a schematic enlarged structure diagram of Part B in FIG. 3.
Figure 5:
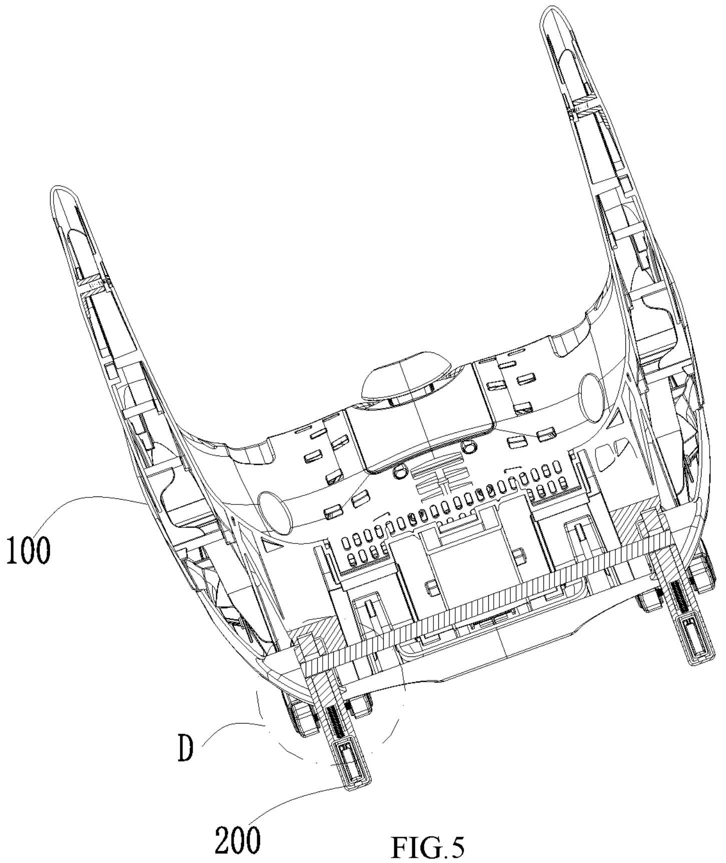
FIG. 5 is a schematic sectional view of the structure along Line C-C in FIG. 3.
Figure 6:
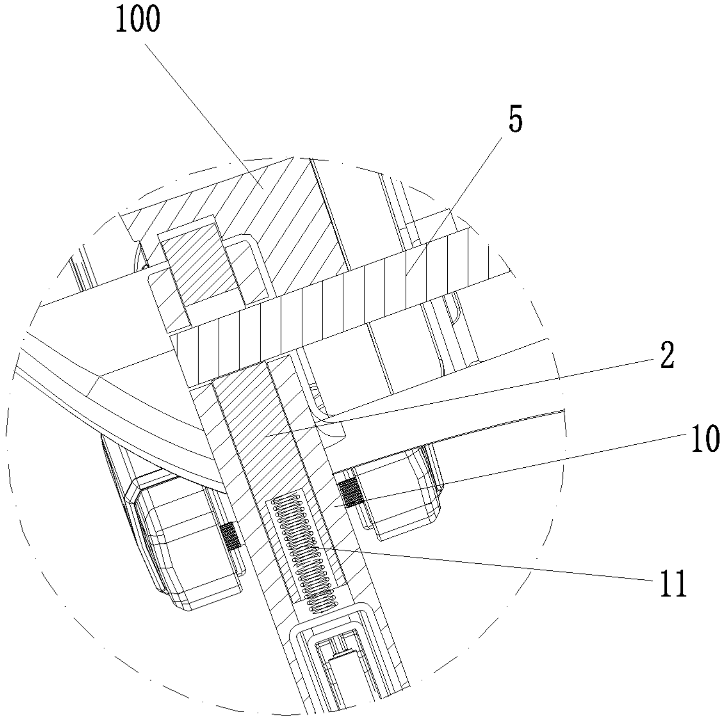
FIG. 6 is a schematic enlarged structure diagram of Part D in FIG. 5 (the locking mechanism is in the locked state)

The present disclosure is further described below combining with the accompanying drawings and specific embodiments:

In the description of the present disclosure, it should be noted that terms “center”, “up”, “down”, “left”, “right”, “vertical”, “horizontal”, “inner”, “outer”, “left-right direction”, “height direction”, “front-rear direction” and the like indicate the orientation or positional relationship based on FIG. 1, the orientation or positional relationship shown when a child is seated in a child safety seat is only for the convenience of describing the present disclosure and simplifying the description, and does not indicate or imply that the indicated device(s) or element(s) must have a specific orientation, only have a specific orientation, be constructed and operated in a specific orientation, and therefore should not be construed as a limitation of the present disclosure. Furthermore, the terms such as “first”, “second” and “third” are used for descriptive purposes only and should not be construed to indicate or imply relative importance.

It should be noted that, unless otherwise specified, when a feature is referred to as “fixed” or “connected” to another feature, it can be directly fixed or connected to another feature, or it can be indirectly fixed or connected to another feature. Unless otherwise expressly specified and limited, the terms “mount”, “communicate”, and “connect” should be understood in a broad sense, for example, it may be fixedly connected or detachably connected, or integrated; it may be mechanically connected or electrically connected; it can be directly connected or indirectly connected through an intermediate medium, or it can be the internal communication of two elements. For those of ordinary skill in the conventional art, the specific meanings of the above terms in the present disclosure can be understood according to specific situations.

A child safety seat, as shown in FIGS. 1 to 19, comprises a seat body 100 and connector 200 rotatably connected to the bottom of the seat body 100 through a rotating shaft 1 that extends obliquely along an up-down direction and used to connect to a vehicle seat, the connector 200 can also protrude forward or rearward relative to the seat body 100 to connect to the vehicle seat, wherein the term “forward” in the present disclosure refers to the direction in which a child faces when riding on the child safety seat, and “rearward” in the present disclosure refers to the direction in which a child backs when riding on the child safety seat, the child safety seat has a forward usage state and a reverse usage state, and is installed by switching between the forward usage state and the reverse usage states through relative rotation between the seat body 100 and connector 200, wherein in the forward usage state of the present disclosure, the direction in which a child faces when riding on the child safety seat is the same as the forward moving direction of the vehicle, while in the reverse usage state, the direction in which a child faces when riding on the child safety seat is opposite to the forward moving direction of the vehicle, and when the child safety seat is in the forward usage state, the connector 200 extends out rearward relative to the seat body 100 to connect to the vehicle seat; and when the child safety seat is in the reverse usage state, the connector 200 extends out forward relative to the seat body 100 to connect to the vehicle seat, and in order to better connect to the vehicle seat, the connector 200 extends horizontally in both the forward usage state and the reverse usage state.

A lower surface of the seat body 100 has a first support surface M that extends horizontally when the child safety seat is in the forward usage state, and when the child safety seat is in the forward usage state, the child safety seat is in a sitting-posture state; a rear surface of the seat body 100 has a second support surface N that extends horizontally when the child safety seat is in the reverse usage state, and when the child safety seat is in the reverse usage state, it is in a lying-posture state. In the sitting-posture state of the present disclosure, an angle $\alpha$ between the plane where the rear surface of the seat body 100 leans and the horizontal plane (see FIG. 10) is larger than that in the lying-posture state, an angle $\beta$ between the plane where the rear surface of the seat body 100 leans (this plane is a virtual plane in the lying-posture state) and the horizontal plane (see FIG. 17) is larger, the plane where the rear surface of the seat body 100 leans in the sitting-posture state and the lying-posture state refers to the plane where the cutting plane at the same position on the rear surface of seat body 100 is located, while in the sitting-posture state, the plane where the rear surface of seat body 100 leans is the plane where the front surface of the vehicle seat is located.

Figure 17:
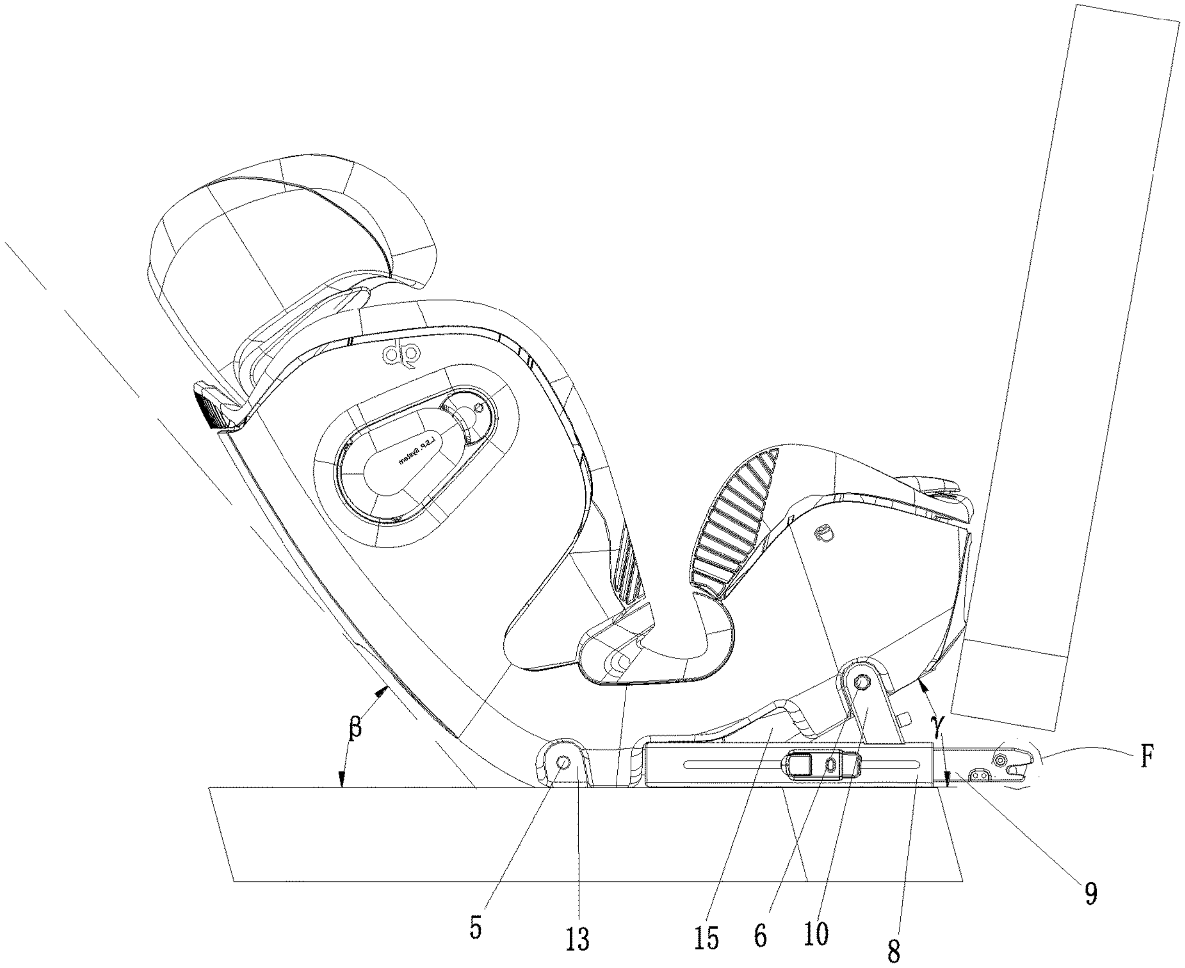
FIG. 17 is a schematic front view of the structure of a child safety seat in the reserve usage state and locked with the vehicle seat according to an embodiment of the present disclosure.

Referring to FIG. 17, an angle $\gamma$ formed between the plane where the first support surface M is located and the plane where the second support surface N is located is an acute angle, the angle $\gamma$ ranges from 5° to 60°, in the reverse usage state, due to that the second support surface N is located on the horizontal plan, an angle formed between the plane where the first support surface M is located and the horizontal plane is also the angle $\gamma$, an acute angle, the angle $\gamma$ formed between the plane where the first support surface M is located and the horizontal plane ranges from 25° to 35°, compared to the arrangement where the first support surface M extends horizontally in both in the forward usage state and the reverse usage state, the provision of the first support surface M and the second support surface N in the child safety seat in this embodiment is to provide a greater angle of inclination and a more comfortable lying position for the child in the reverse usage state, correspondingly, in order to cooperate with the lying posture in the reverse usage state, in the forward usage state, the rotating shaft 1 extends downwards and obliquely from front to rear, and in the reverse usage state, the rotating shaft 1 extends upwards and obliquely from front to rear, the rotating shaft 1 is fixedly connected to the connector 200, an angle δ between the axis of the rotating shaft 1 and the plane where an upper surface of the connector 200 is located (see FIG. 20) is an obtuse angle, the angle δ ranges from 100°-110°, in this embodiment, the obtuse angle δ between the axis of the rotating shaft 1 and the upper surface of the connector 200 is 105°.

A first connecting piece capable of being connected to or separated from the connector 200 is arranged on the seat body 100 and behind the rotating shaft 1, a second connecting piece capable of being connected to or separated from the connector 200 is arranged on the seat body 100 and in front of the rotating shaft 1, and in order to simplify the structure of the child safety seat, the first connecting piece and the second connecting piece are respectively a first connecting rod 5 and a second connecting rod 6 extended along the left-right direction of the seat body 100.

In this embodiment, the connector 200 is symmetrically provided on the left and right sides of the seat body 100, and correspondingly, both the first connecting rod 5 and the second connecting rod 6 are arranged on the left and right sides of the seat body 100, respectively.

Figure 18:
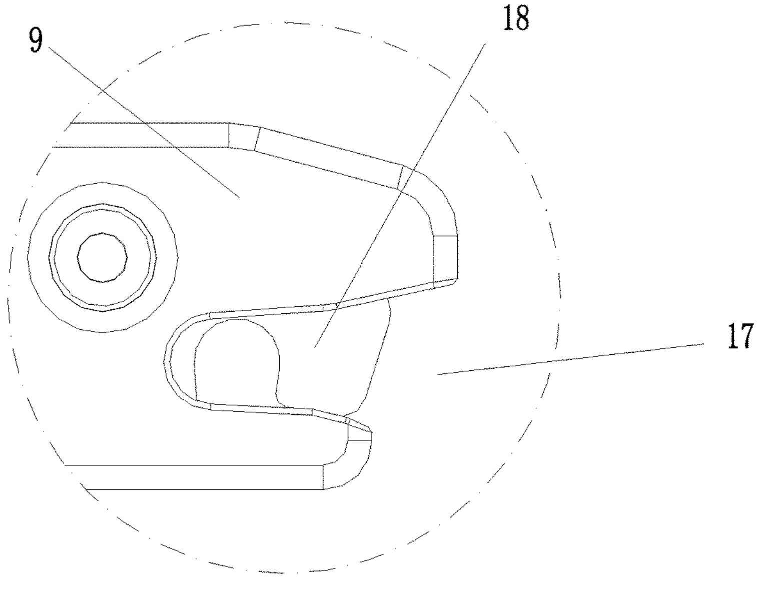
FIG. 18 is a schematic enlarged structure diagram of Part F in FIG. 17.
Figure 19:
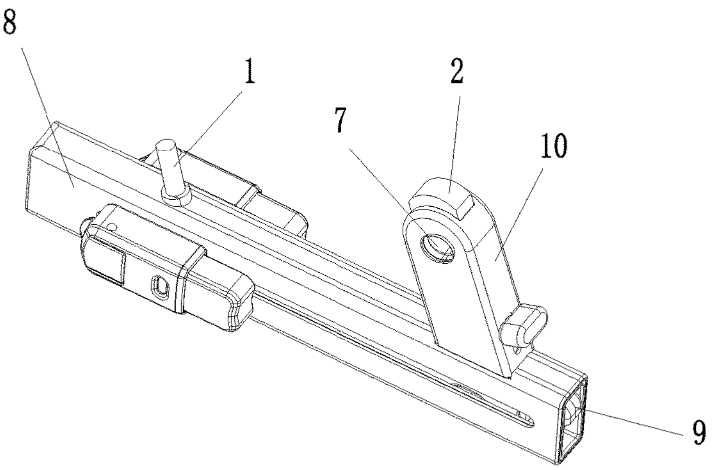
FIG. 19 is a schematic front view of a connector of a child safety seat according to an embodiment of the present disclosure.

Referring to FIGS. 18-19, the connector 200 on each side comprises a connector body and a third connecting piece 10 fixedly arranged on the connector body, the connector body comprises a connecting frame 8 that is rotatably connected to the bottom of the seat body 100 through the rotating shaft 1 and a joint 9 that is slidably connected to the connecting frame 8 along the front-rear direction of the seat body 100 and is used for connecting to the vehicle seat, the joint 9 can be extended from one end portion of the connecting frame 8 to connect to the vehicle seat, and the length of the joint 9 extending from the connecting frame 8 is adjustable, the joint 9 has an opening 17 for connecting the ISOFIX interface on the vehicle seat, a movable locking hook portion 18 is further arranged within the opening 17 for coordinating and connecting to the vehicle seat, and the movable locking hook portion 18 can be folded or extended relative to the upper side wall of the opening 17, the movable locking hook portion 18 also has an opening, and the third connecting piece 10 is fixedly arranged on the connecting frame 8. In this embodiment, in order to ensure smooth connection between the third connecting piece 10 and the seat body 100 in forward usage state, the third connecting piece 10 is provided to extend downwards and obliquely from front to rear in forward usage state.

The connectors 200 on the two sides are respectively connected to or separated from two ends of the first connecting rod 5 or the second connecting rod 6, and when the connectors 200 on the two sides are respectively connected to the two ends of the first connecting rod 5, the child safety seat is in the forward usage state; when the connectors 200 on the two sides are respectively connected to the two ends of the second connecting rod 6, the child safety seat is in the reverse state; when the connectors 200 on the two sides are both separated from the first connecting rod 5 and the second connecting rod 6, the connectors 200 on the two sides can rotate relative to the seat body 100. Specifically, the connector 200 is provided with a through hole 7 for inserting or separating from the first connecting rod 5 or the second connecting rod 6, the through hole 7 is opened on the third connecting piece 10, when the first connecting rod 5 or the second connecting rod 6 is inserted into the through hole 7, the connector 200 is connected to the first connecting rod 5 or the second connecting rod 6; when both the first connecting rod 5 and the second connecting rod 6 are separated from the through hole 7, both the first connecting rod 5 and the second connecting rod 6 are separated from the connector 200, and the connector 200 can be rotated relative to the seat body 100.

At the bottom of the seat body 100, corresponding to the two end portions of the first connecting rod 5 and the two end portions of the second connecting rod 6, first avoidance grooves 13 and second avoidance grooves 14 for avoiding the third connecting rod 10 are provided, and when the first connecting rod 5 or the second connecting rod 6 is inserted into the through hole 7 on the third connecting piece 10, the third connecting piece 10 is located inside the first avoidance groove 13 or the second avoidance groove 14.

In this embodiment, the existing connection relationship is sufficient for the connection relationship between the joint 9 and the connecting frame 8, which is not the focus, it is only necessary to ensure that joint 9 can extend from one end portion of the connecting frame 8 out of the connecting frame 8, and the length of the extension can be adjusted and accommodated in the connecting frame 8.

The child safety seat further comprises a locking mechanism for locking the child safety seat in the forward usage state and the reverse usage state, the locking mechanism is arranged between the seat body 100 and the connector 200, and one locking mechanism is respectively arranged between the connectors 200 on the two sides and the seat body 100.

The locking mechanism on each side comprises a locking member 2 slidably arranged on the connector 200, and a first locking slot 3 and a second locking slot 4 located at the bottom of the seat body 100 and on the front and rear sides of the rotating shaft 1, and fitted to insert or separate from the locking member 2, the first locking slot 3 is located behind the second locking slot 4, and when the locking member 2 is inserted and matched with the first locking slot 3, the locking mechanism locks the safety seat in the forward usage state; when the locking member 2 is inserted and matched with the second locking slot 4, the locking mechanism locks the safety seat in the reverse usage state; when the locking member 2 is separated from both the first locking slot 3 and the second locking slot 4, the locking mechanism is unlocked.

Figure 20:
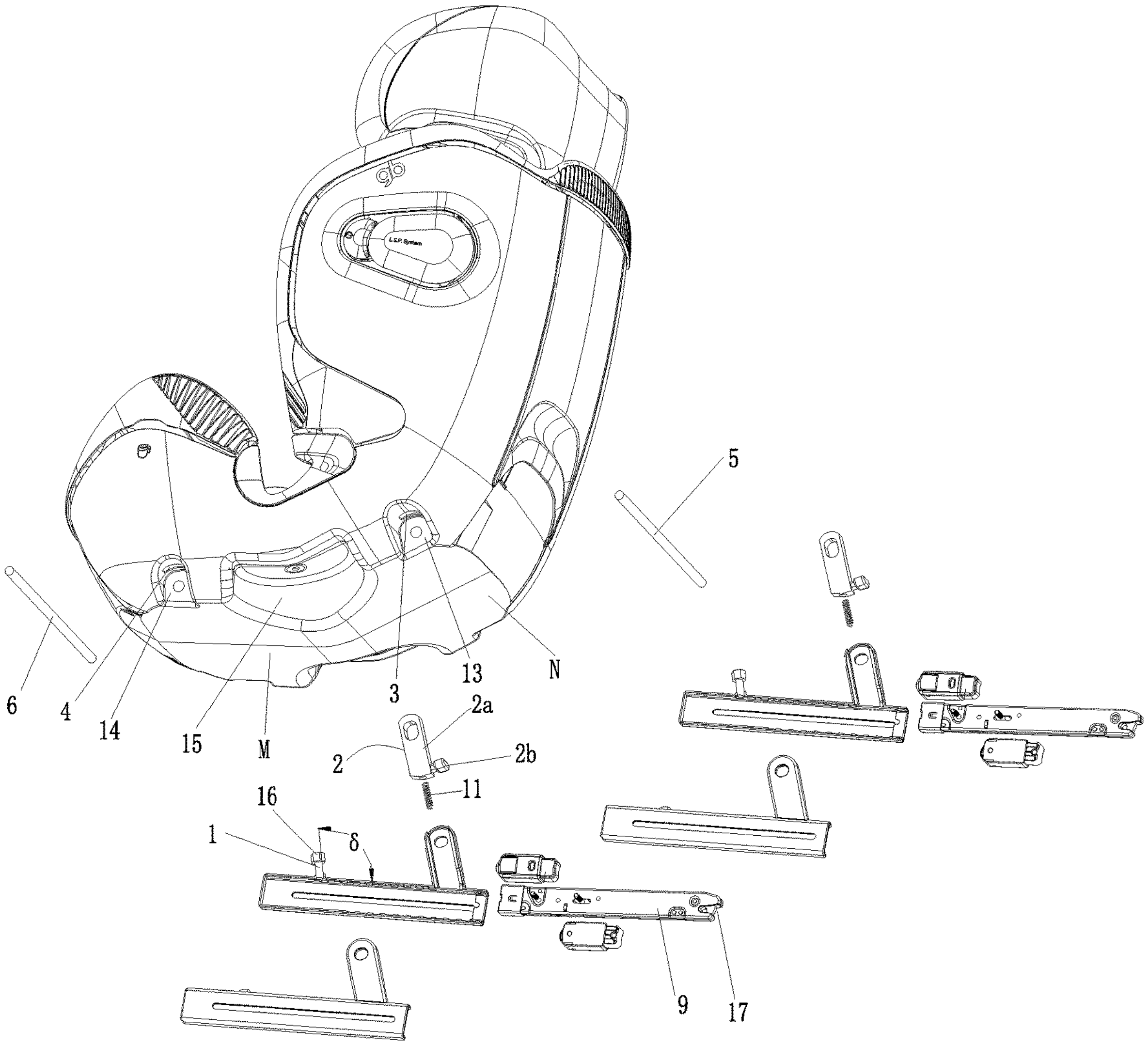
FIG. 20 is a schematic exploded structure diagram of a child safety seat according to an embodiment of the present disclosure.

The locking member 2 is slidably arranged on the third connecting piece 10, and the locking mechanism further comprises an elastic element 11 arranged between the locking member 2 and the connecting frame 8 to make the locking member 2 tend to be inserted into the first locking slot 3 or the second locking slot 4, the elastic element 11 is a spring, and the locking member 2 has an operating portion **2*b* for operating the locking member 2 to make the locking member 2 tend to be separated from the first locking slot 3 or the second locking slot 4, as shown in FIG. 20, the locking member 2 comprises a sliding portion 2*a* slidably arranged on the third connecting piece 10 and this operating portion 2*b* fixedly arranged on the sliding portion 2*a*, specifically, the sliding portion 2*a* is slidably arranged inside the third connecting piece 10 and one end portion of the sliding portion 2*a* passes through the third connecting piece 10 and is inserted into or separated from the first locking slot 3 or the second locking slot 4, a sliding groove 12 is disposed on the third connecting piece 10 at the corresponding position of the operating portion 2$b$ along the sliding direction of the sliding portion 2$a$, and the operating portion 2$b$ slides through the sliding groove 12**.

Referring to FIG. 20, the first locking slot 3 is opened on the upper groove wall of the first avoidance groove 13, the second locking slot 4 is opened on the upper groove wall of the second avoidance groove 14, and a through groove is opened on the sliding portion 2$a$ of the locking member 2 corresponding to the through hole 7 of the third connecting piece 10, and when the first connecting rod 5 or the second connecting rod 6 is inserted into the through hole 7, the first connecting rod 5 or the second connecting rod 6 is also inserted into the through groove and can slide relative to the through groove.

In this embodiment, the third connecting piece 10 is used to connect to or separate from the seat body 100, and the locking member 2 and the elastic element 11 are respectively arranged inside the third connecting piece 10, greatly simplifying the structure of the safety seat.

Referring to FIG. 19, the rotating shaft 1 is extended obliquely in an up-down direction, and the lower end portion of the rotating shaft 1 is fixedly connected to the connecting frame 8, an inserting hole is opened at the bottom of the seat body 100 corresponding to the position of the rotating shaft 1, the rotating shaft 1 is inserted into the inserting hole and rotates in the inserting hole, and the upper end portion of the rotating shaft 1 is further provided with a position limit element 16 for preventing the rotating shaft 1 from sliding out of the inserting hole and preventing the connector 200 from detaching from the seat body 100. A third avoidance groove 15 is opened at the bottom of the seat body 100 corresponding to the position of the connecting frame 8 of the connector 200 to avoid the rotation of the connecting frame 8, and the connector 200 rotates 180° around the axis of the rotating shaft 1.

The connecting frame 8 is divided into a connecting frame segment I and a connecting frame segment II at the connection between the rotating shaft 1 and the connecting frame 8, the length of the connecting frame segment II is longer than that of the connecting frame segment I, the third connecting piece 10 is fixed on the connecting frame segment II, the third avoidance groove 15 is used to avoid the connecting frame segment I, and when the safety seat is in the forward usage state or the reverse usage state, the upper surface of the connecting frame segment I is in contact with the upper groove wall of the third avoidance groove 15, to achieve further support and stability for connector 200, the angle between the axis of rotating shaft 1 and the plane where the upper surface of the connecting frame segment II ranges from 100°-110°.

The working principle of this child safety seat:

Referring to FIGS. 1 to 10, the child safety seat is in forward usage state, the connecting frame 8 of connector 200 extends horizontally, and the first support surface M of the seat body 100 extends horizontally as a support, the third connecting piece 10 is connected to the first connecting rod 5, and the end portion of the first connecting rod 5 is inserted into the through hole 7 of the third connecting piece 10, the third connecting piece 10 is located in the first avoidance groove 13, the locking member 2 is inserted into the first locking slot 3, and the locking mechanism locks the safety seat in the forward usage state, at this time, the joint 9 of the connector 200 slides rearward relative to the seat body 100 out of the connecting frame 8 and is connected to the ISOFIX interface of the vehicle seat through the movable locking hook portion 18, the opening 17 on the joint 9 faces towards the rear of the child safety seat, and the opening of the movable locking hook portion 18 is arranged downwards.

Figure 7:
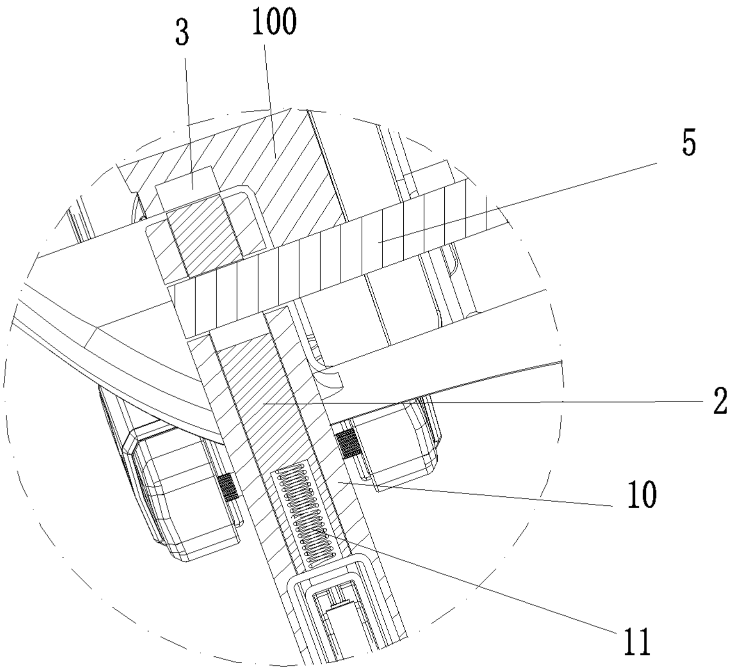
FIG. 7 is a schematic enlarged structure diagram of Part D in FIG. 5 (the locking mechanism is in the unlocked state)
Figure 8:
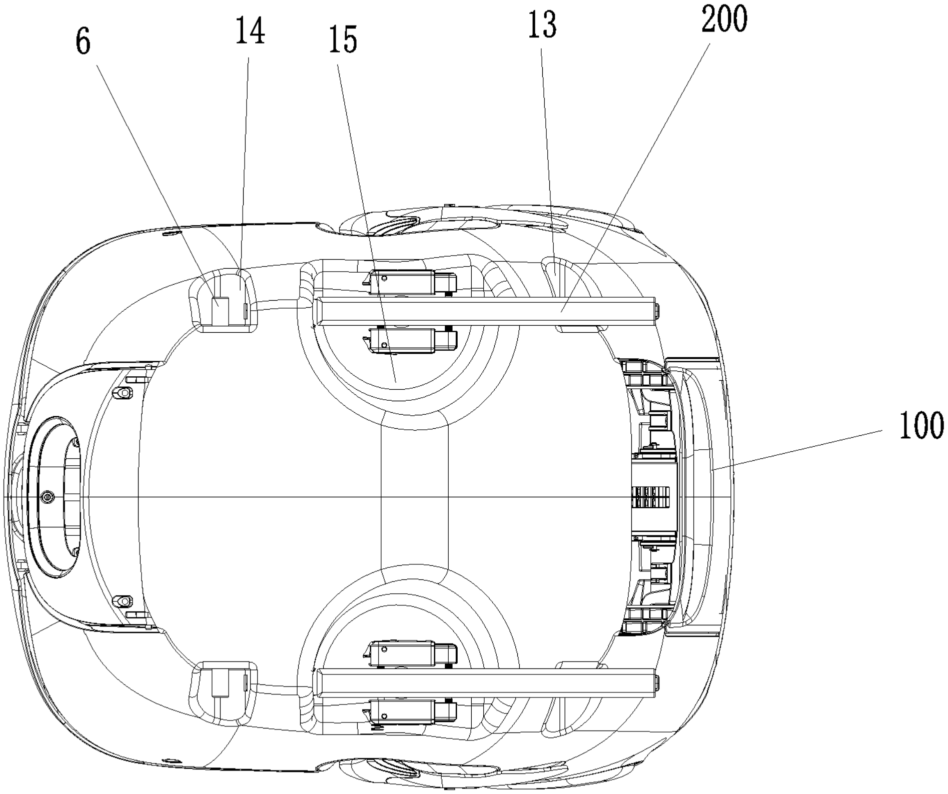
FIG. 8 is a schematic bottom view of the structure of a child safety seat in the forward usage state according to an embodiment of the present disclosure.
Figure 9:
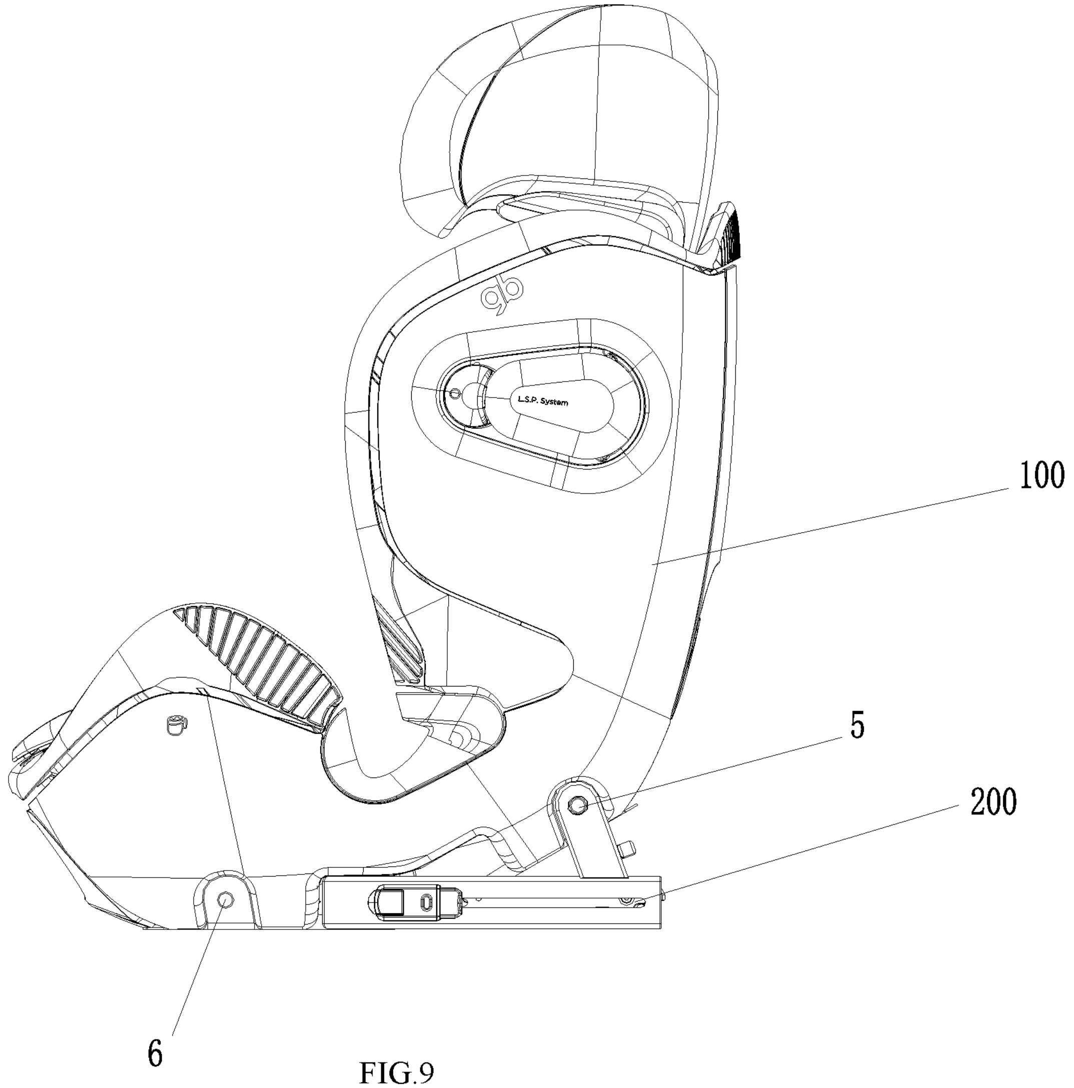
FIG. 9 is a schematic front view of the structure of a child safety seat in the forward usage state according to an embodiment of the present disclosure.
Figure 10:
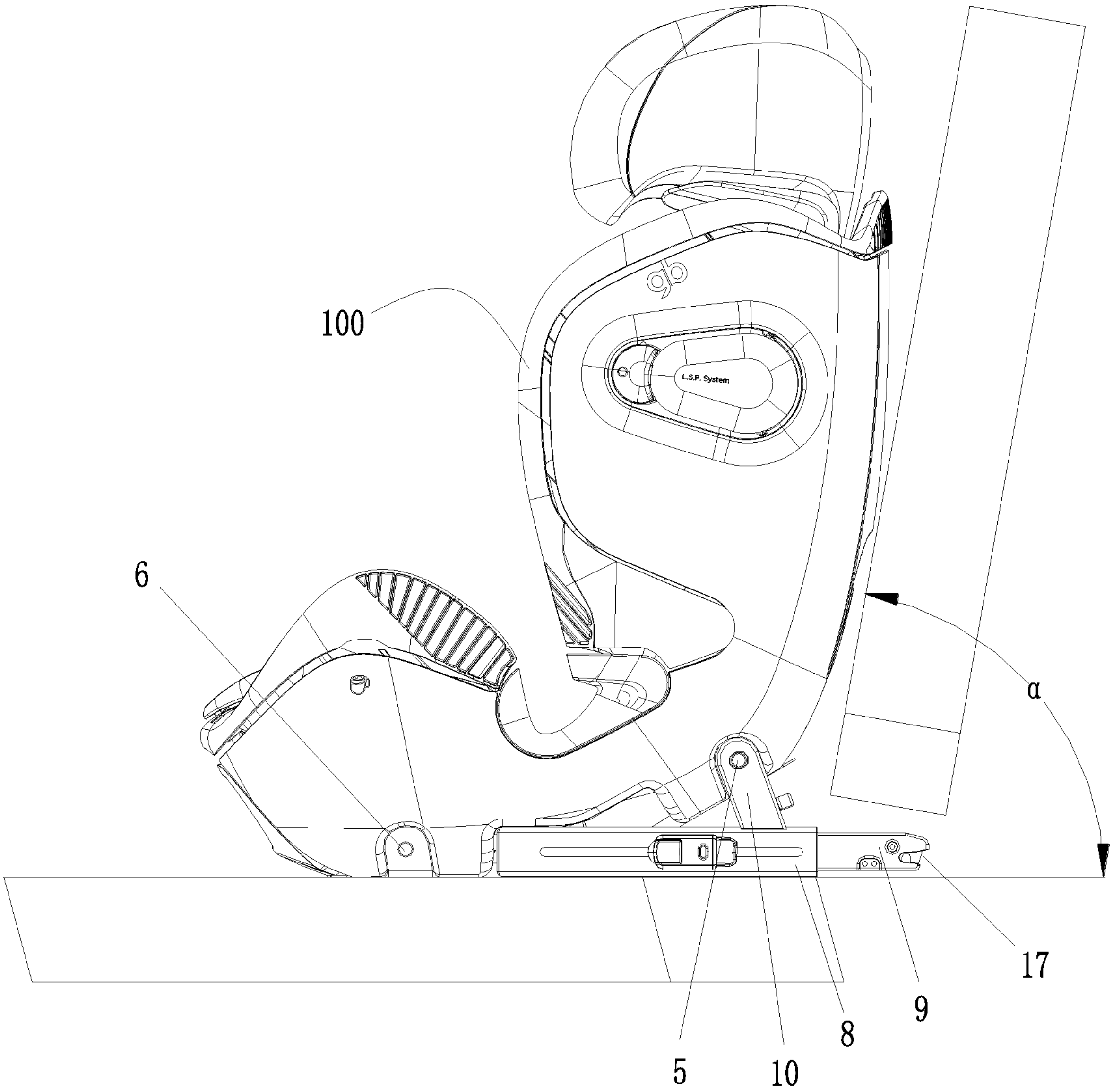
FIG. 10 is a schematic front view of the structure of a child safety seat in the forward usage state and locked with the vehicle seat according to an embodiment of the present disclosure.
Figure 11:
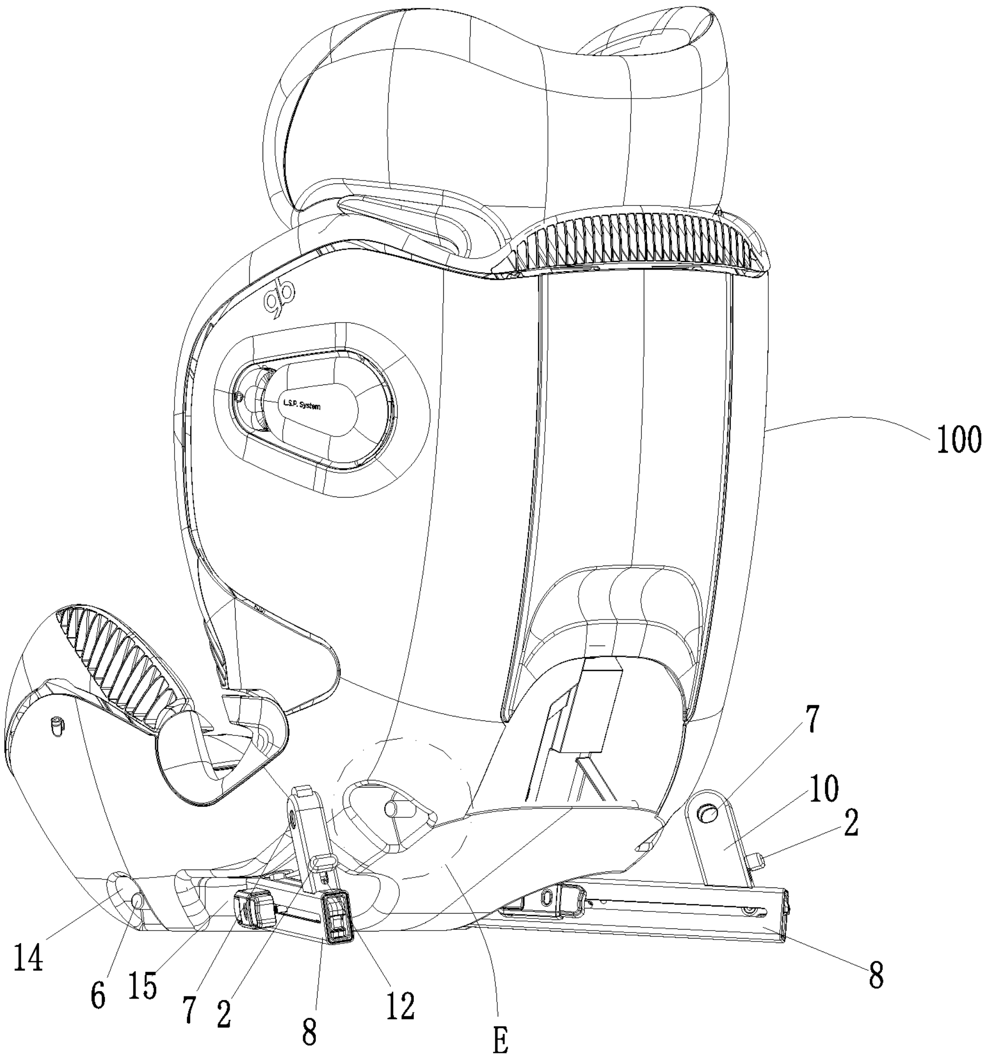
FIG. 11 is a three-dimensional structure schematic diagram of a child safety seat in the rotation process according to an embodiment of the present disclosure.
Figure 12:
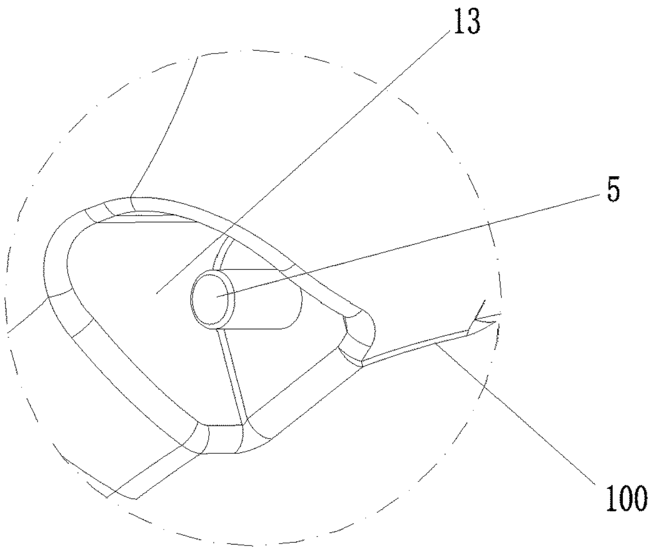
FIG. 12 is a schematic enlarged structure diagram of Part E in FIG. 11.
Figure 13:
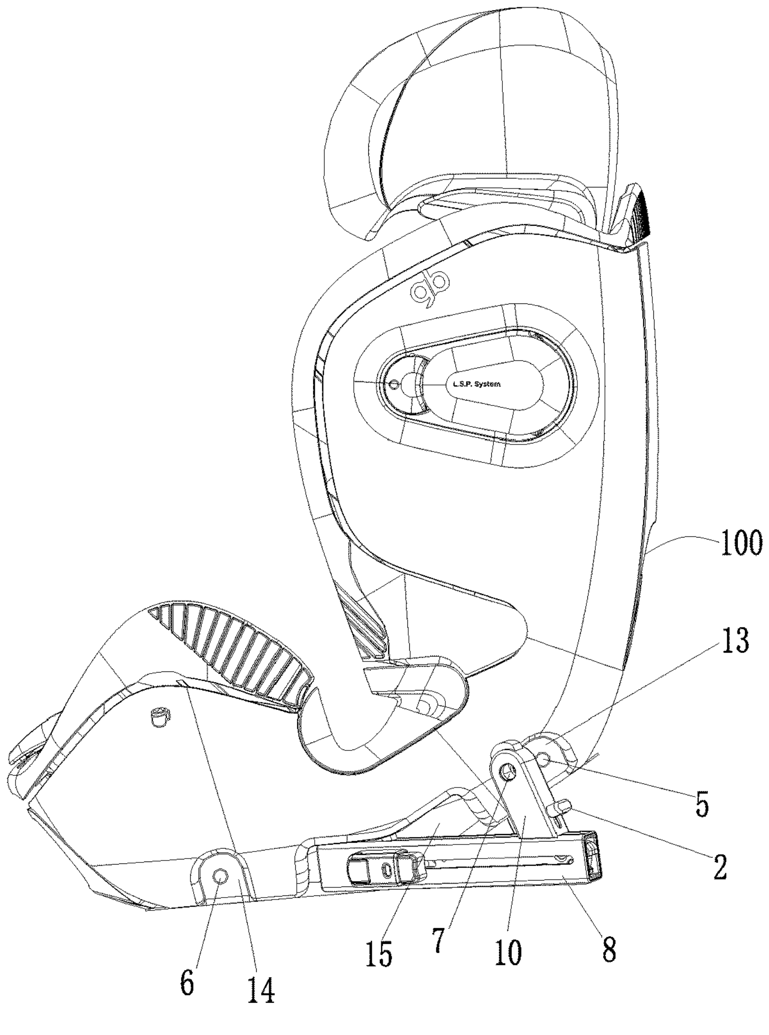
FIG. 13 is a schematic front view of the structure of a child safety seat in the rotation process according to an embodiment of the present disclosure.
Figure 14:
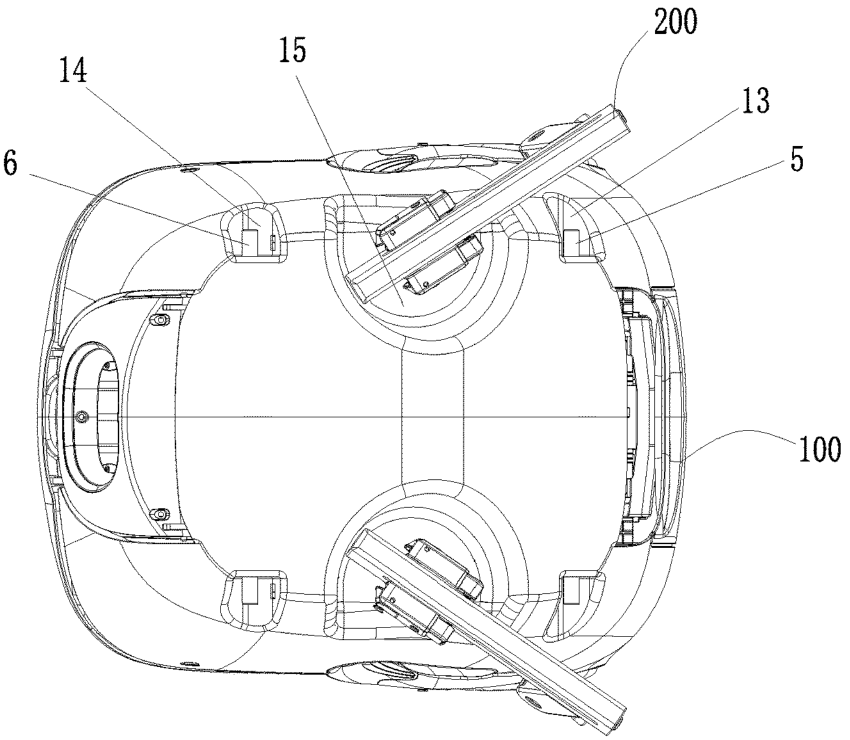
FIG. 14 is a schematic bottom view of the structure of a child safety seat in the rotation process according to an embodiment of the present disclosure.

When the child safety seat needs to be used in the reverse direction, the connector 200 is separated from the vehicle seat, and then the operating portion 2$b$ of the locking member 2 is operated to slide the sliding portion 2$a$ downwards and compress the elastic element 11, thereby causing the sliding portion 2$a$ to detach from the first locking slot 3, as shown in FIG. 7, the locking mechanism is unlocked, and the operating portion 2$b$ is released, and the sliding portion 2$a$ slides upwards and resets under the action of the elastic element 11. Then the third connecting piece 10 of the connector 200 is separated from the first connecting rod 5, and the connector 200 is rotated around the rotating shaft 1, as shown in FIGS. 11 to 14, until the third connecting piece 10 is connected to the second connecting rod 6, the operating portion 2$b$ is operated to slide the sliding portion 2$a$ downwards and continue to rotate the connector 200, and when the connector 200 is rotated by 180°, the operating portion 2$b$ is released, and the sliding portion 2$a$ is inserted into the second locking slot 4 under the action of the elastic element 11, the locking mechanism is locked, and the connector 200 is fixed relative to the seat body 100.

Figure 15:
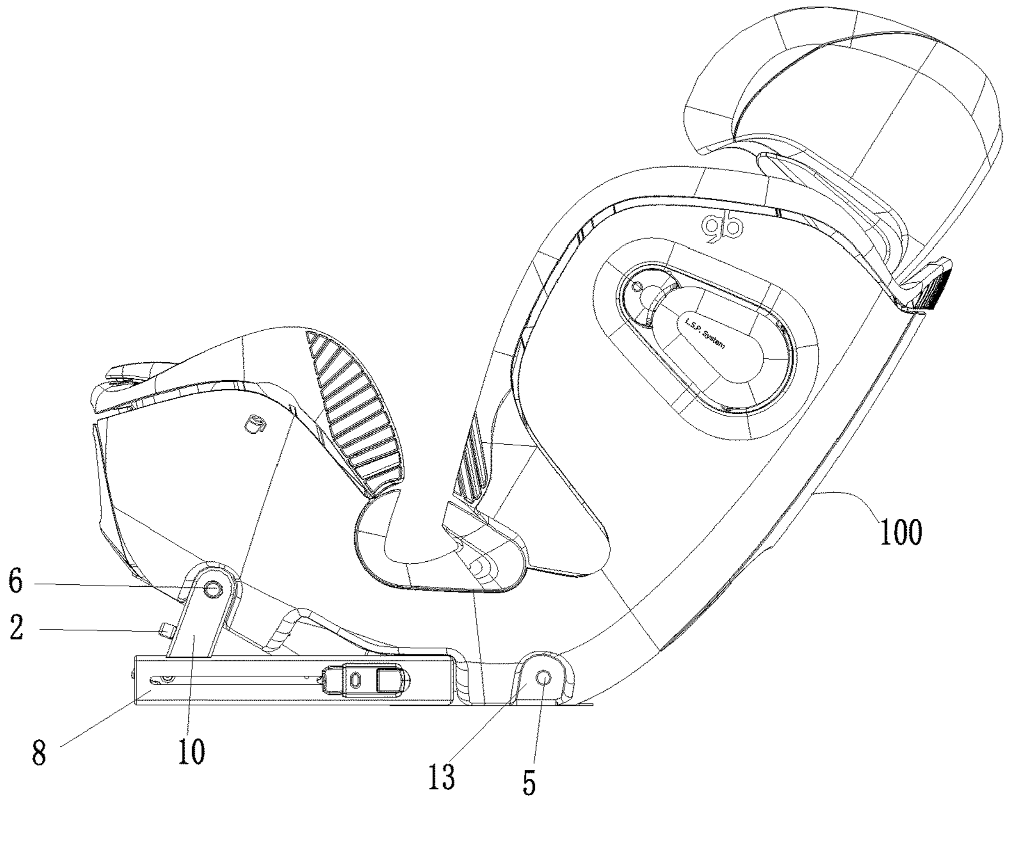
FIG. 15 is a schematic front view of the structure of a child safety seat in the reserve usage state according to an embodiment of the present disclosure.
Figure 16:
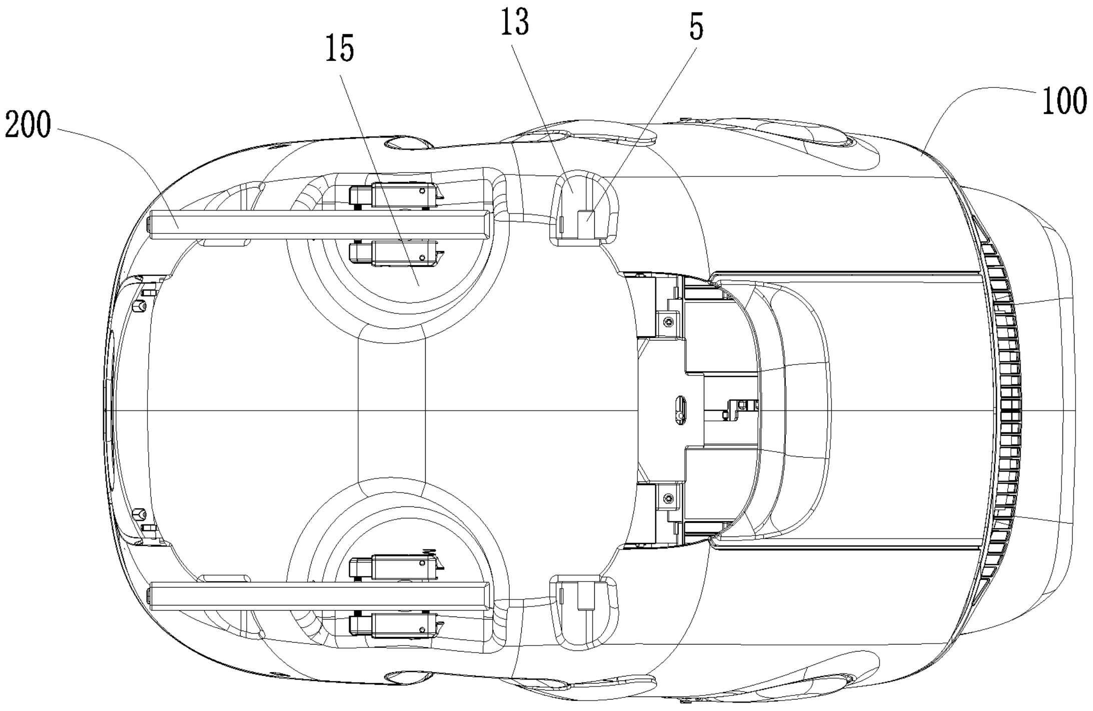
FIG. 16 is a schematic bottom view of the structure of a child safety seat in the reserve usage state according to an embodiment of the present disclosure.

Then the seat body 100 is reversely installed on the vehicle seat, so that the second support surface N of the seat body 100 extends horizontally as a support, the connecting frame 8 of the connector 200 extends horizontally, and the joint 9 of the connector 200 slides out of the connecting frame 8 and is connected to the ISOFIX interface of the vehicle seat, as shown in FIGS. 15 to 17, the joint 9 of the connector 200 slides forward relative to the seat body 100 out of the connecting frame 8 and is connected to the ISOFIX interface of the vehicle seat, the opening 17 on the joint 9 faces towards the front of the child safety seat, and the opening of the movable locking hook portion 18 is still arranged downwards. When the safety seat is in the forward usage state or the reverse usage state, the opening 17 of the joint 9 is always opposite to the forward moving direction of the vehicle, and the opening of the movable locking hook portion 18 is always arranged downwards to facilitate coordination with the ISOFIX interface of the vehicle seat.

The safety seat can be reversed only by operating the connector 200 to rotate relative to the seat body 100, and then installed in the forward or reverse direction, which is convenient to operate, and compared with traditional safety seats, it greatly simplifies the structure of the seat body 100, making the structure of the child safety seat simpler and more convenient to process.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A child safety seat, comprising:

a seat body; and a connector connected to the seat body for connecting to a vehicle seat, the child safety seat having a forward usage state and a reverse usage state, wherein the connector is movably arranged on the seat body, and the connector is configured to protrude forward or rearward relative to the seat body to connect to the vehicle seat, and a relative movement between the seat body and the connector enables the child safety seat to switch between the forward usage state and the reverse usage state for installation;

wherein the connector is rotatably connected to the seat body through a rotating shaft that extends obliquely along an up-down direction, and the rotating shaft is fixedly connected to the connector.

2. The child safety seat according to claim 1, wherein in the forward usage state, the rotating shaft extends obliquely and downwards from front to rear, and in the reverse usage state, the rotating shaft extends obliquely and upwards from front to rear.

3. The child safety seat according to claim 2, wherein an angle between an axis of the rotating shaft and a plane where an upper surface of the connector is located is an obtuse angle, or an angle between the axis of the rotating shaft and the plane where the upper surface of the connector is located ranges from 100°-110°.

4. The child safety seat according to claim 1, wherein a first connecting piece capable of being connected to or separated from the connector is arranged on the seat body and behind the rotating shaft, a second connecting piece capable of being connected to or separated from the connector is arranged on the seat body and in front of the rotating shaft, and when the connector is connected to the first connecting piece, the safety seat is in the forward usage state; when the connector is connected to the second connecting piece, the safety seat is in the reverse usage state; when the connector is separated from both the first connecting piece and the second connecting piece, the connector moves relative to the seat body.

5. The child safety seat according to claim 4, wherein the connector comprises a connector body rotatably connected to a bottom of the seat body through the rotating shaft; and a third connecting piece fixedly arranged on the connector body for connecting to or separating from the first connecting piece or the second connecting piece, and the third connecting piece extends obliquely along an up-down direction.

6. The child safety seat according to claim 5, wherein in the forward usage state, the third connecting piece extends obliquely and downwards from front to rear.

7. The child safety seat according to claim 4, wherein the first connecting piece and the second connecting piece are respectively a first connecting rod and a second connecting rod extending along the left-right direction of the seat body, and the connector is provided with a through hole fitted to insert or separate from the first connecting rod or the second connecting rod.

8. The child safety seat according to claim 1, further comprising a locking mechanism for locking the child safety seat in the forward usage state or the reverse usage state, the locking mechanism comprises a locking member movable arranged on one of the seat body and the connector, a first locking slot and a second locking slot that are arranged on the other one of the seat body and the connector respectively on two opposite sides of a rotating shaft and fitted to insert or separate from the locking member, and when the locking member is inserted into any one of the first locking slot and the second locking slot, the locking mechanism locks the child safety seat in the forward usage state or the reverse usage state; when the locking member is separated from both the first locking slot and the second locking slot, the locking mechanism is unlocked.

9. The child safety seat according to claim 8, wherein the connector comprises a connector body rotatably connected to a bottom of the seat body through the rotating shaft; and a third connecting piece fixedly arranged on the connector body, the locking member is slidably connected to the third connecting piece, and the first locking slot and the second locking slot are respectively arranged on the seat body and the first locking slot is located behind the second locking slot.

10. The child safety seat according to claim 9, wherein the locking mechanism further comprises an elastic element arranged between the locking member and the connector body such that the locking member tends to be inserted into the first locking slot or the second locking slot, and the locking member has an operating portion for operating the locking member to tend to separate from both the first locking slot and the second locking slot.

11. The child safety seat according to claim 10, wherein the locking member comprises a sliding portion slidably arranged on the third connecting piece and the operating portion fixedly arranged on the sliding portion, the sliding portion is slidably arranged inside the third connecting piece and one end portion of the sliding portion passes through the third connecting piece and is inserted into or separated from the first locking slot or the second locking slot, a sliding groove is disposed on the third connecting piece at a corresponding position of the operating portion along a sliding direction of the sliding portion, and the operating portion slides through the sliding groove.

12. The child safety seat according to claim 1, wherein two connectors are symmetrically provided on left and right sides of the seat body, and the connector on each side comprises a connector body rotatably connected to a bottom of the seat body and a third connecting piece fixedly arranged on the connector body, the connector body comprises a connecting frame that is rotatably connected to the bottom of the seat body and a joint that is slidably connected to the connecting frame along a front-rear direction of the seat body and is used for connecting to the vehicle seat, the joint is configured to extend from one end portion of the connecting frame out of the connecting frame to connect to the vehicle seat, and a length of the joint extending from the connecting frame is adjustable, the third connecting piece is fixedly arranged on the connecting frame, and the third connecting piece is configured to be connected to or separated from the front or rear of the seat body.

13. The child safety seat according to claim 12, wherein the joint has an opening for connecting an ISOFIX interface on the vehicle seat, and when the child safety seat is in the forward usage state or the reverse usage state, the opening faces opposite to a forward moving direction of a vehicle.

14. The child safety seat according to claim 13, wherein the joint is further provided with a movable locking hook portion within an opening for coordinating and connecting to the vehicle seat, and the movable locking hook portion is configured to be folded or extended relative to an upper side wall of the opening.

15. The child safety seat according to claim 12, wherein the joint further extends forward or rearward relative to the seat body to connect to the vehicle seat, and when the child safety seat is in the forward usage state, the joint extends rearward relative to the seat body to connect to the vehicle seat; when the child safety seat is in the reverse usage state, the joint extends forward relative to the seat body to connect to the vehicle seat.

16. The child safety seat according to claim 1, wherein when the child safety seat is in the forward usage state, the connector extends rearward relative to the seat body to connect to the vehicle seat; when the safety seat is in the reverse usage state, the connector extends forward relative to the seat body to connect to the vehicle seat.

17. The child safety seat according to claim 1, wherein a lower surface of the seat body has a first support surface that extends horizontally when the child safety seat is in the forward usage state, and when the child safety seat is in the forward usage state, the child safety seat is in a sitting-posture state; a rear surface of the seat body has a second support surface that extends horizontally when the child safety seat is in the reverse usage state, and when the child safety seat is in the reverse usage state, the child safety seat is in a lying-posture state.

18. The child safety seat according to claim 17, wherein an angle formed between a plane where the first support surface is located and a plane where the second support surface is located is an acute angle, or an acute angle formed between the plane where the first support surface is located and the plane where the second support surface is located is 5° to 60°:

and/or, in the reverse usage state, an angle formed between the plane where the first support surface is located and a horizontal plane is an acute angle, or in the reverse usage state, an acute angle formed between the plane where the first support surface is located and the horizontal plane is 25° to 35°.

* * * * *